(12) United States Patent
Rozenshein et al.

(10) Patent No.: US 6,418,527 B1
(45) Date of Patent: Jul. 9, 2002

(54) DATA PROCESSOR INSTRUCTION SYSTEM FOR GROUPING INSTRUCTIONS WITH OR WITHOUT A COMMON PREFIX AND DATA PROCESSING SYSTEM THAT USES TWO OR MORE INSTRUCTION GROUPING METHODS

(75) Inventors: Zvika Rozenshein, Kfar Saba; Jacob Tokar, Ashdod; Uri Dayan, Herzelia, all of (IL); Joe Paul Gergen, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/170,690

(22) Filed: Oct. 13, 1998

(51) Int. Cl.⁷ .............................. G06F 15/00
(52) U.S. Cl. ............ 712/208; 712/204; 712/205; 712/206; 712/209; 712/212; 712/213; 712/214; 712/215
(58) Field of Search ................. 712/204, 208, 712/212, 215, 205, 206, 209, 213, 214

(56) References Cited

U.S. PATENT DOCUMENTS

| | | | |
|---|---|---|---|
| 5,560,028 A | | 9/1996 | Sachs et al. ............... 395/800 |
| 5,630,083 A | * | 5/1997 | Carbine et al. ............ 712/212 |
| 5,655,097 A | * | 8/1997 | Witt et al. ................. 712/204 |
| 5,689,672 A | * | 11/1997 | Witt et al. ................. 712/213 |
| 5,732,234 A | * | 3/1998 | Vassiliadis et al. ........ 712/200 |
| 5,794,003 A | * | 8/1998 | Sachs ....................... 712/215 |
| 5,796,973 A | * | 8/1998 | Witt et al. ................. 712/208 |
| 5,822,778 A | * | 10/1998 | Dutton et al. .............. 711/208 |
| 6,044,450 A | * | 3/2000 | Tsushima et al. ........... 712/24 |
| 6,275,927 B2 | * | 8/2001 | Roberts ..................... 712/213 |

OTHER PUBLICATIONS

Nov., 1998 IEEE Spectrum, vol. 35, No. 11, "Engineering the EV future", Article: High–flying DSP architectures, pp. 53–56. (Resubmit).

* cited by examiner

*Primary Examiner*—Zarni Maung
*Assistant Examiner*—Nabil El-Hady
(74) *Attorney, Agent, or Firm*—Robert L. King

(57) ABSTRACT

A system for instructing a data processor, the system including an instruction root having an operation selection field for selecting an operation to be performed by said data processor and an instruction prefix. The instruction prefix has a field selected from the group of a conditional execution field for selecting a condition under which a data processor will perform said selected operation, an operand length modification field for modifying the selected operation so as to be performed on an operand having a different length, an instruction group field for selecting a length of an instruction group that includes the instruction root, and a prefix length selection field for selecting a length of said instruction prefix. A data processor system responsive to this instruction system is also disclosed. An instruction system for statically grouping instructions without using an instruction prefix is also disclosed.

12 Claims, 11 Drawing Sheets

DATA PROCESSOR INSTRUCTION SYSTEM FOR GROUPING INSTRUCTIONS WITH OR WITHOUT A COMMON PREFIX AND DATA PROCESSING SYSTEM THAT USES TWO OR MORE INSTRUCTION GROUPING METHODS

FIELD OF THE INVENTION

The present invention relates generally to data processors, and more particularly to methods and apparatus for grouping data processor instructions and an instruction system for use therewith.

BACKGROUND OF THE INVENTION

Many different types of data processors are available. Some data processors have multiple execution units that may be used concurrently. Scheduling of instructions for such data processors can be either dynamic or static. Both types of systems operate on a sequential instruction stream which has been prepared for execution using conventional program preparation software tools, including optimizing assemblers and compilers. In general, dynamic systems require significantly more hardware in the data processor, while static systems require more sophisticated program preparation software techniques. The common goal, however, is to identify and exploit instruction level parallelism inherent in the instruction stream while maintaining the appearance of sequentiality of execution.

In a dynamic instruction scheduling system, special hardware within the data processor maintains a sliding window of visibility into the sequential instruction stream. Each instruction dispatch cycle, the scheduling hardware selects as many of the visible instructions as can be instruction serial constraints. Additional hardware maintains a record of each instruction while in flight and, depending upon system conditions, either aborts or retires the instruction appropriately. An example of a dynamically scheduled data processor is the Motorola MPC604 microprocessor.

In a static instruction scheduling system, the program preparation software tool, after it has generated and, perhaps, optimized the serial instruction stream, reexamines that stream and, based upon information describing the hardware configuration and operating characteristics of the target data processor, groups together those instructions that can safely be executed in parallel. Due to the difficulty of predicting the actions of certain program constructs, such as indirect or computed memory references, it is not possible to guarantee optimal scheduling in advance. To accommodate such non-predictable constructs, some hardware interlocks will usually be provided. An example of a statically scheduled data processor was the Multiflow Trace 7/1428. The compiler for the Trace machine was commonly referred to as the Bulldog compiler, the name given it by its original authors while at Yale University.

In grouping instructions for the Trace, which was a Very Long Instruction Word (VLIW) machine, the Bulldog compiler was constrained to a VLIW having either 7, 14 or 28 fixed function instruction slots, depending on the machine model. Any instruction slot for which the compiler could not find useful work was simply filled with a no-operation (NOP) instruction (i.e., all zeroes). Rather than store these useless NOPs in memory, the compiler squashed out the NOPs and preceded the set of useful instruction words comprising each VLIW with a bit map which indicated the location of the squashed NOPs (or, viewed conversely, the useful instruction words). At prefetch time, the Trace cache/ memory controller used the information in the bit map word to regenerate the NOPs so that the cache was filled with fully populated VLIWs. The bit map was discarded once the corresponding VLIWs were regenerated during prefetch, and no part of the instruction dispatch or execution hardware was even aware of their existence. This mechanism, even though it increased by one word the logical length of every VLIW in memory, generally tended to reduce the physical length of the stored VLIWs due to the inability of the compiler to fill all of the instruction slots in every VLIW with useful instruction words. On the other hand, for well designed code, this mechanism could significantly increase the actual code size in memory.

A more recent example of a statically scheduled data processor is the Texas Instruments TMS320C62xx microprocessor family ('C62). In the 'C62, every instruction word includes a dedicated "P" bit which, if set by the program preparation software tool, indicates to the dispatch hardware that the instruction word can be dispatched in parallel with the following instruction word. Thus, a simultaneously dispatchable "execution packet" is comprised of an instruction word having a clear P bit and up to a maximum number of preceding instruction words, each having a set P bit. U.S. Pat. No. 5,560,028 discloses a variation on this mechanism in which the sense of the parallel dispatch control bit is toggled between each set of parallel-dispatchable instruction words. In the above statically scheduled systems, by dedicating a bit of each instruction to the grouping function, a significant portion of the instruction is not useable for other functions, such as encoding data processing operations.

A premium is placed on execution speed for processing data and instructions using such a multiple execution data processor. However, as the complexity of the data processor architecture is increased using multiple execution units, the computer instruction code size tends to increase. In many applications, increased code size is undesirable due to increased cost and space needed for additional memory. One such application is a class of data processors known as digital signal processors (DSP). DSPs are used in many applications, such as cellular phones, where a premium is placed on small size and low power. It would be desirable for a multiple execution unit data processor to provide faster instruction processing without significantly expanding instruction code size.

Accordingly, there is a need for improved methods and apparatus for grouping computing instructions and for an improved instruction system.

BRIEF DESCRIPTION OF THE DRAWINGS

While the invention is pointed out with particularity in the appended claims, other features of the invention are disclosed by the following detailed description taken in conjunction with the accompanying drawings, in which:

DESCRIPTION OF THE PREFERRED EMBODIMENTS

Figure 1:
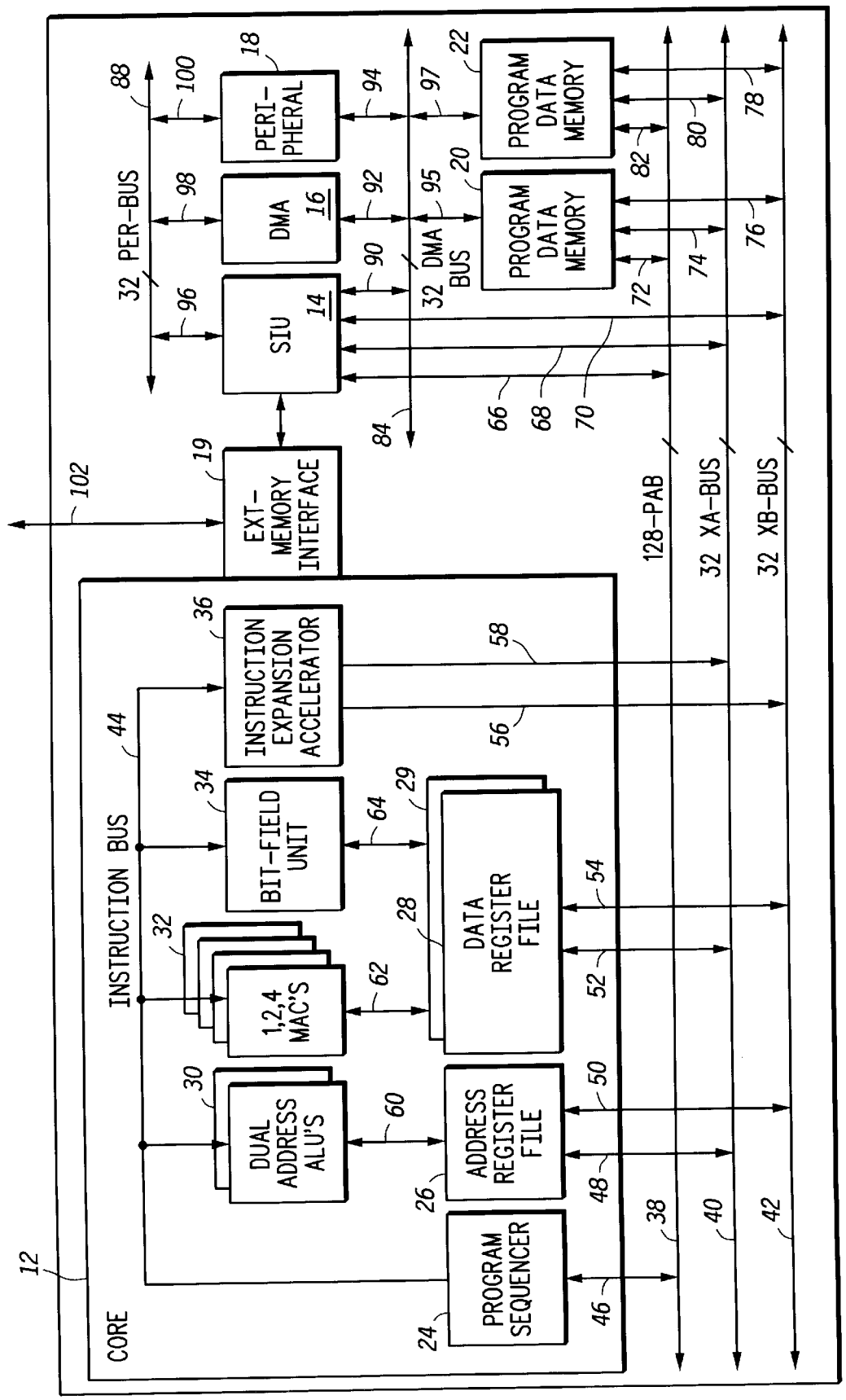
FIG. 1 is a block diagram of an embodiment of a data processing system.

Generally, one aspect of the present invention relates to an instruction system that includes an instruction root having an operation selection field for selecting an operation to be performed by a data processor and an instruction prefix. The prefix has a field that may be any one or more of the following: a conditional execution field for selecting a condition under which a data processor will perform the selected operation, an operand length modification field for modifying the selected operation so as to be performed on an operand having a different length, an instruction group field for selecting a length of an instruction group, and a prefix length selection field for selecting a length of the instruction prefix.

In accordance with another aspect of the present invention, an instruction system for use in a data processor that has a plurality of registers is provided. The instruction system includes an instruction root having a register selection field of width m, for selecting one of $2^m$ registers in the data processor, and an instruction prefix having a register selection extension field of width n, for extending the width of said register selection field to select one of $2^{m+n}$ registers in said data processor.

In accordance with another aspect of the present invention, an instruction system for use in a data processor is provided. The data processor is adapted to execute first and second types of operations sequentially and a plurality of the first types of operations in parallel. The instruction system has an operation selection field for selecting one of the first and second types of operations to be executed by the data processor. The operation selection field has a type subfield of width n, the values of which are assigned as follows: a first value if said first type of operation is to be executed sequentially; a second value if said first type of operation is to be executed in parallel; and a third value selected from the remaining ($2^n-2$) values if said second type of operation is to be executed. In a particular embodiment, the type subfield may optionally be assigned the second value if a selected instruction of the second type of operations is to be executed sequentially.

In accordance with another aspect of the present invention, a system for instructing a data processor adapted to execute first and second types of operations sequentially and a plurality of said first type of operations in parallel is provided. The system includes an instruction having an operation selection field for selecting one of the first and second types of operations to be executed by the data processor. The operation selection field has a type subfield. The type subfield has a first value for instructions of said first type to be executed sequentially, a second value for instructions of said first type to be executed in parallel and for a selected instruction of said second type to be executed sequentially, and a third value otherwise.

It should be noted that the particular terms and expressions employed and the particular structural and operational details disclosed in the detailed description and accompanying drawings are for illustrative purposes only and are not intended to in any way limit the scope of the invention as described in the appended claims.

Referring to FIG. 1, an embodiment of a processing system 10 is illustrated. The processing system 10 includes a processor core 12, a system interface unit (SIU) 14, a direct memory access unit 16, a peripheral 18, such as a serial communication port or timer, internal memory modules 20, 22, and an external memory interface module 19. The processing system 10 may also be referred to as a data processor.

The processor core 12 includes an address register file 26, a program sequencer 24, data register files 28, 29, address arithmetic logic units 30 (also referred to as address generation units (AGU)), multiply and accumulate (MAC) units (32) (also referred to generally as data arithmetic logic units (DALU)), a bit field and logic unit 34, and an optional instruction expansion accelerator 36. The address ALUs 30 are coupled to the address register file 26 via internal bus 60. The multiply and accumulate units 32 are coupled to the data register files 28, 29 via internal bus 62, and bit field unit 34 is coupled to the data register files 28, 29 via internal bus 64. The program sequencer 24 is coupled via the instruction bus 44 to the address ALUs 30, the DALUs 32, the bit field unit 34, and the instruction expansion accelerator 36.

The system 10 further includes a program bus 38, a first data bus 40, a second data bus 42, a peripheral bus 88, a direct memory access (DMA) bus 84, and an external memory interface bus 102. The program bus 38 is coupled to the program sequencer 24 via bus 46, to SIU 14 via bus 66, and to internal memory 20, 22 via buses 72 and 82 respectively. The data buses 40, 42 are coupled to address register file 26 via buses 48, 50, to data register files 28, 29 via buses 52, 54, and to instruction expansion accelerator 36 via buses 56, 58. The data buses 40, 42 are coupled to memory 20, 22 via buses 74–80.

The DMA bus 84 is coupled to SIU 14 via bus 90, to DMA 16 via bus 92, to peripheral unit 18 via bus 94, and to memory units 20, 22 via buses 95 and 97 respectively. The peripheral bus 88 is coupled to the SIU 14 via bus 96, to DMA 16 via bus 98, and to peripheral unit 18 via bus 100. The external memory bus 102 is coupled to external memory interface module 19 and is coupled to external memory (not shown) in communication with the system 10. In the illustrated embodiment, the program bus 38 is 128 bits wide, and the other buses 40, 42, 84, and 88 are 32 bits wide.

Figure 2:
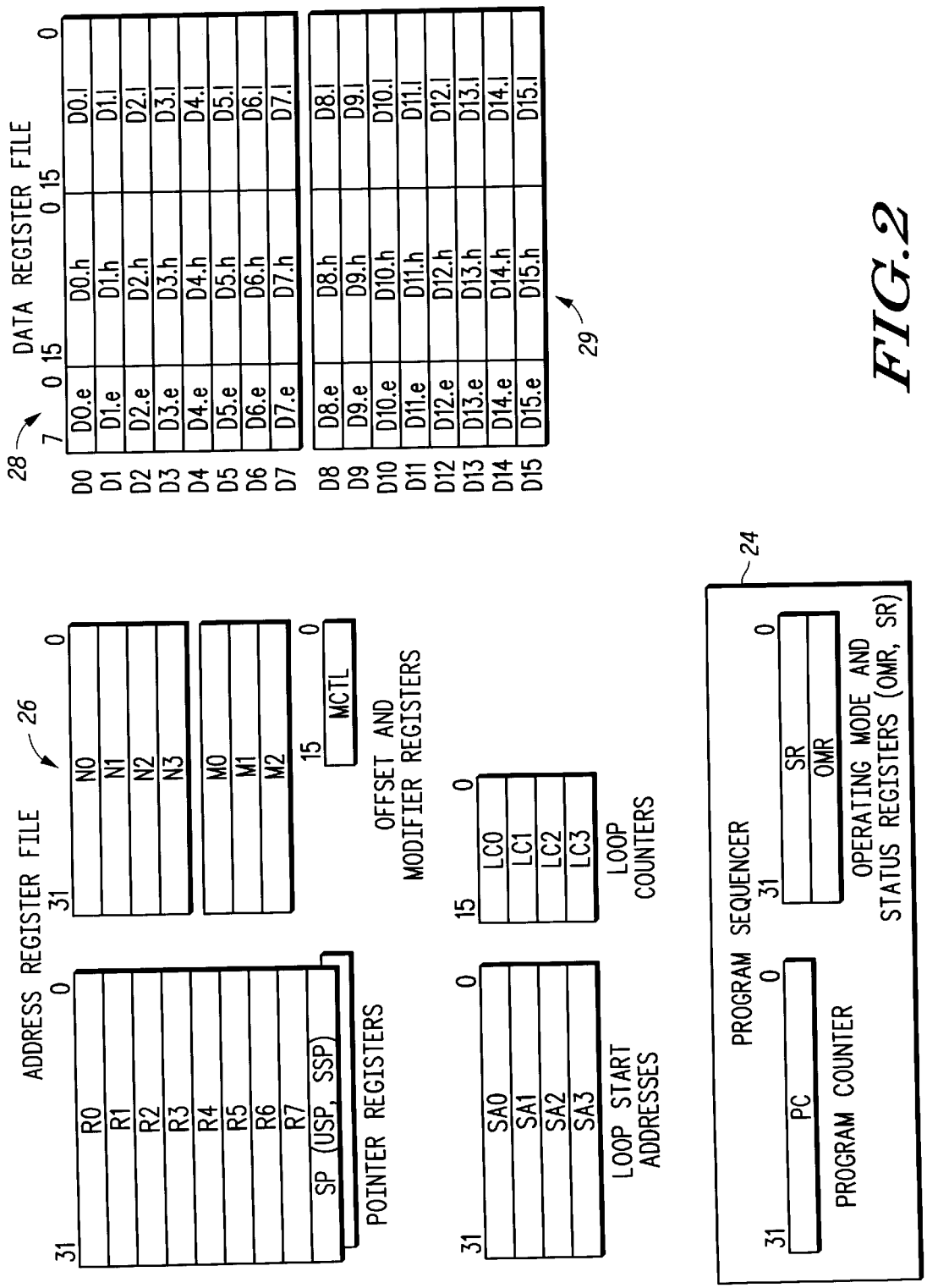
FIG. 2 is a diagram that illustrates registers within the core of the system of FIG. 1.

Referring to FIG. 2, a particular embodiment of registers within the core 12 of the system 10 is disclosed. As illustrated, the address register file 26 includes registers R0–R7, stack pointer (SP), N0–N3, M0–M2, MCTL, SA0–SA3, LC0–LC3. The program sequencer 24 includes the program counter, status register, and operating mode and status registers. The data register file 28 includes registers D0–D7 and the data register file 29 includes registers D8–D15. In an alternative embodiment, only a single register file may be used to save cost, such as with the one or two MAC configurations. In other high performance applications, more than two register files may also be used.

Figure 3:
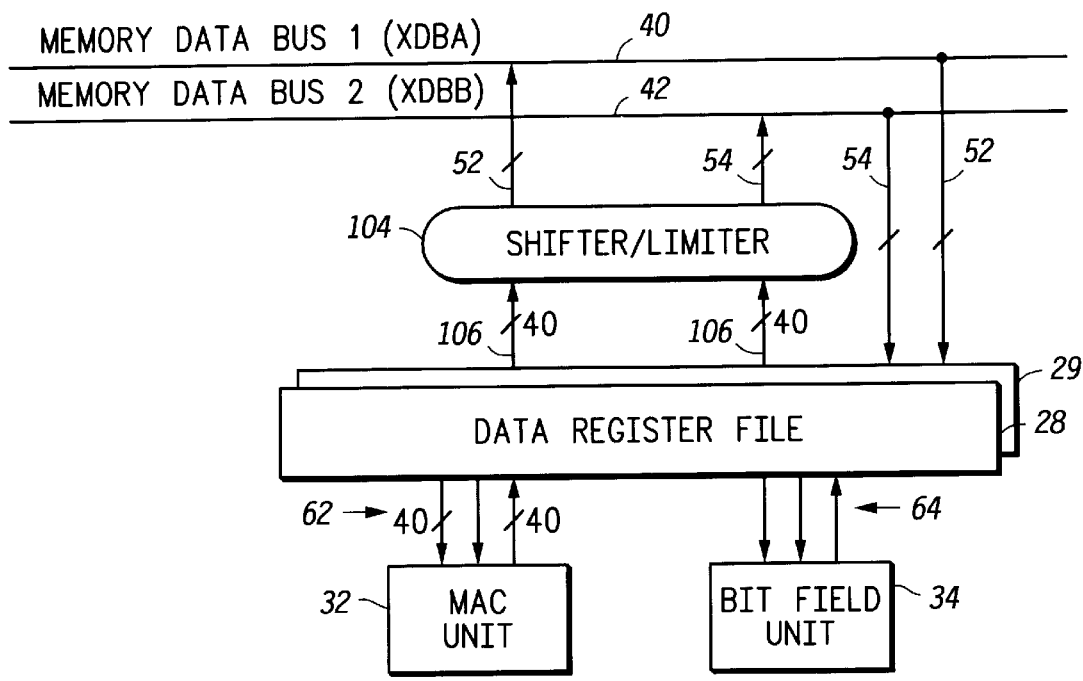
FIG. 3 is diagram that illustrates a particular embodiment of a portion of the core of the system of FIG. 1 with a single multiply and accumulate unit.

Referring to FIG. 3, a particular embodiment having one multiply accumulator 32 within the core 12 is illustrated. In this embodiment, the single MAC 32 is coupled to the register files 28, 29 via bus 62. The bit field unit 34 is coupled to the data register files 28, 29 via bus 64. The data register files 28, 29 are coupled to the data buses 40, 42 via an intermediate shifter/limiter module 104 and via buses 52, 54, 106. The shifter/limiter module 104 is used to convert data in a 40 bit format over buses 106 into a 16 bit format over buses 52, 54.

Figure 4:
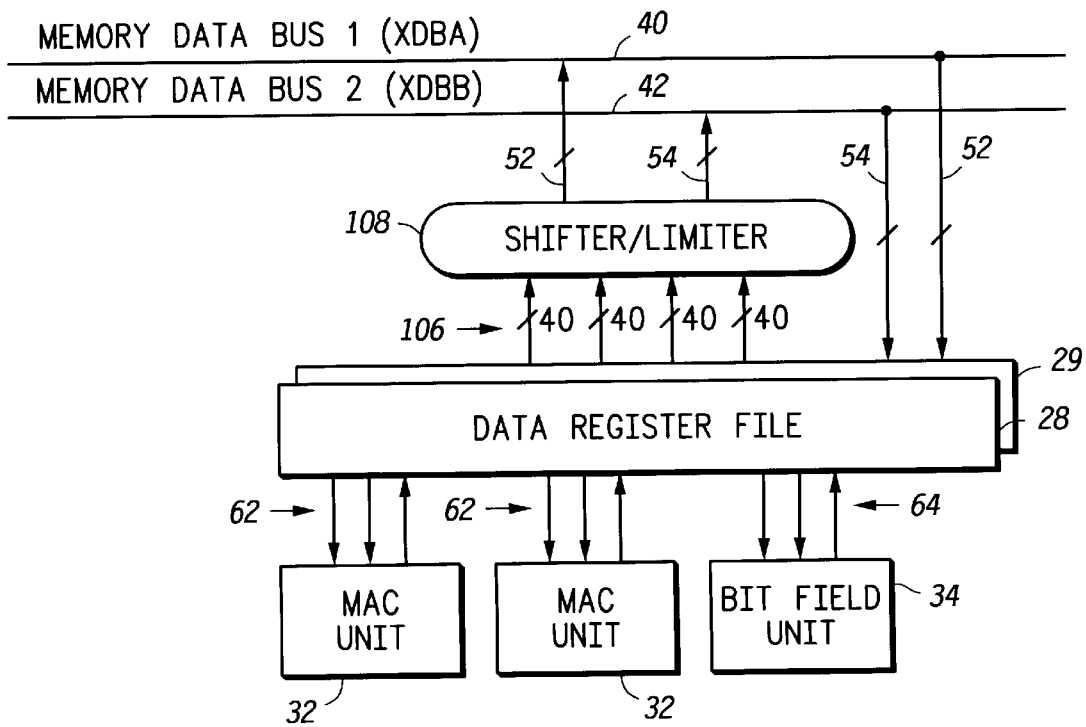
FIG. 4 is diagram that illustrates another embodiment of a portion of the core of the system of FIG. 1 with two multiply and accumulate units.
Figure 5:
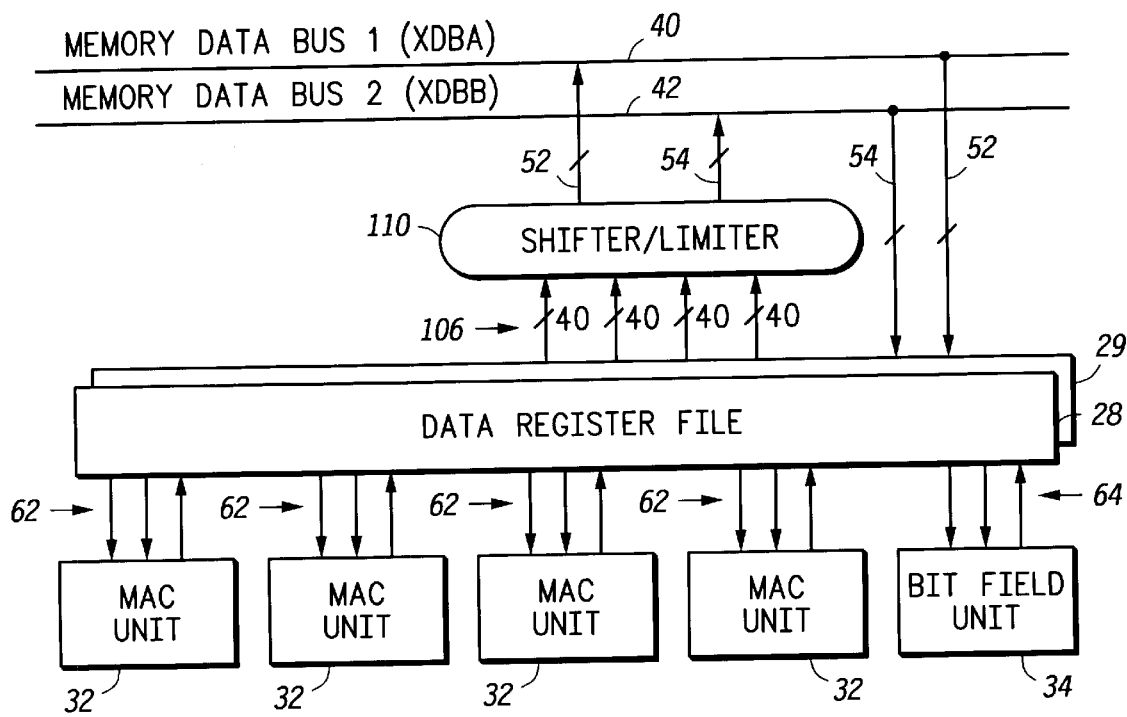
FIG. 5 is diagram that illustrates another embodiment of a portion of the core of the system of FIG. 1 with four multiply and accumulate units.

Referring to FIG. 4, a particular embodiment having two multiply accumulators 32 within the core 12 is illustrated. This embodiment is similar to the embodiment of FIG. 3, except that there are two MAC 32 units instead of one MAC 32. An additional bus 62 is needed to couple the data register files 28, 29 to the second MAC unit 32. Also, the buses 52, 54 are 32 bits instead of 16 bits to carry the extra data from the two MACs. Similarly, FIG. 5 illustrates an embodiment having four MAC units 32. It is to be understood that the present invention is not to be limited by the above exemplary configurations and is not limited to the particular number of MAC units 32 or the particular arrangements thereof.

Figure 6:
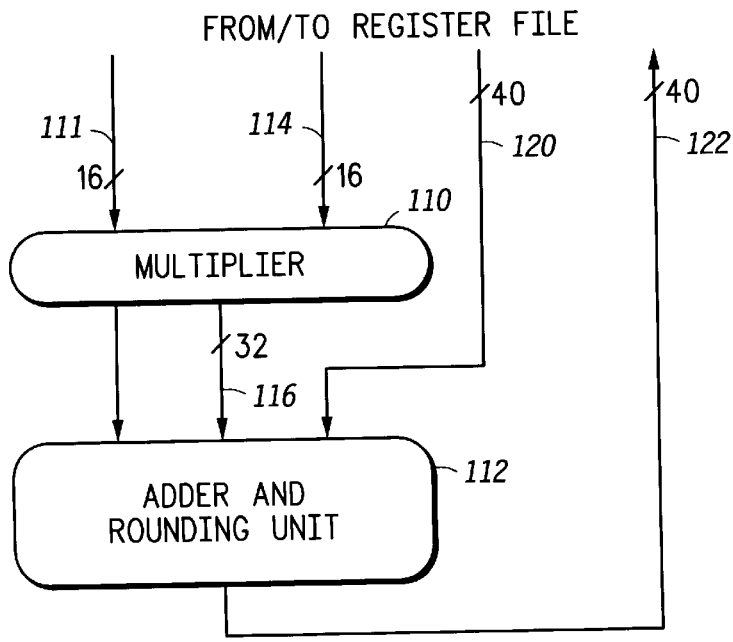
FIG. 6 is a diagram that illustrates a particular embodiment of the multiply and accumulate unit of FIGS. 3–5.
Figure 7:
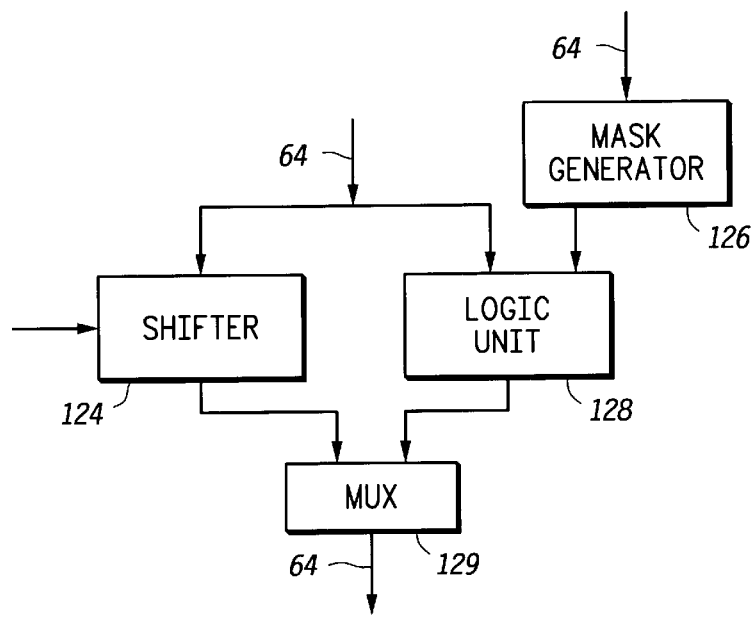
FIG. 7 is a diagram that illustrates a particular embodiment of the bit field and logic unit of the system of FIG. 1.

Referring to FIG. 6, a particular embodiment of a MAC unit 32 is illustrated. The MAC unit 32 includes a multiplier 110 and an adder 112. The multiplier 110 receives data input from the data register files 28, 29, and multiplies the data elements 111, 114 to produce a multiplied output 116 that is input to the adder 112. The adder sums a second data input 120 and the multiplier result 116 to produce an accumulated result 122 that is output back to the data register file 28, 29.

Referring to FG. 7, a particular embodiment of the bit field logic unit 34 is disclosed. The bit field logic unit 34 includes a shifter 124, a mask bit generator 126, a logic unit 128, and a multiplexer 129. The bit field and logic unit receives input via bus 64 and produces an output that is the result of either a shift, a masking operations, e.g. removing certain bits from the input data, and/or a logical operation, such as a logical and, or, exclusive or, or invert operation. The result of the selected operation is output as a forty bit result over the two-way bus 64 back to a selected register within the register file 28, 29.

Figure 8:
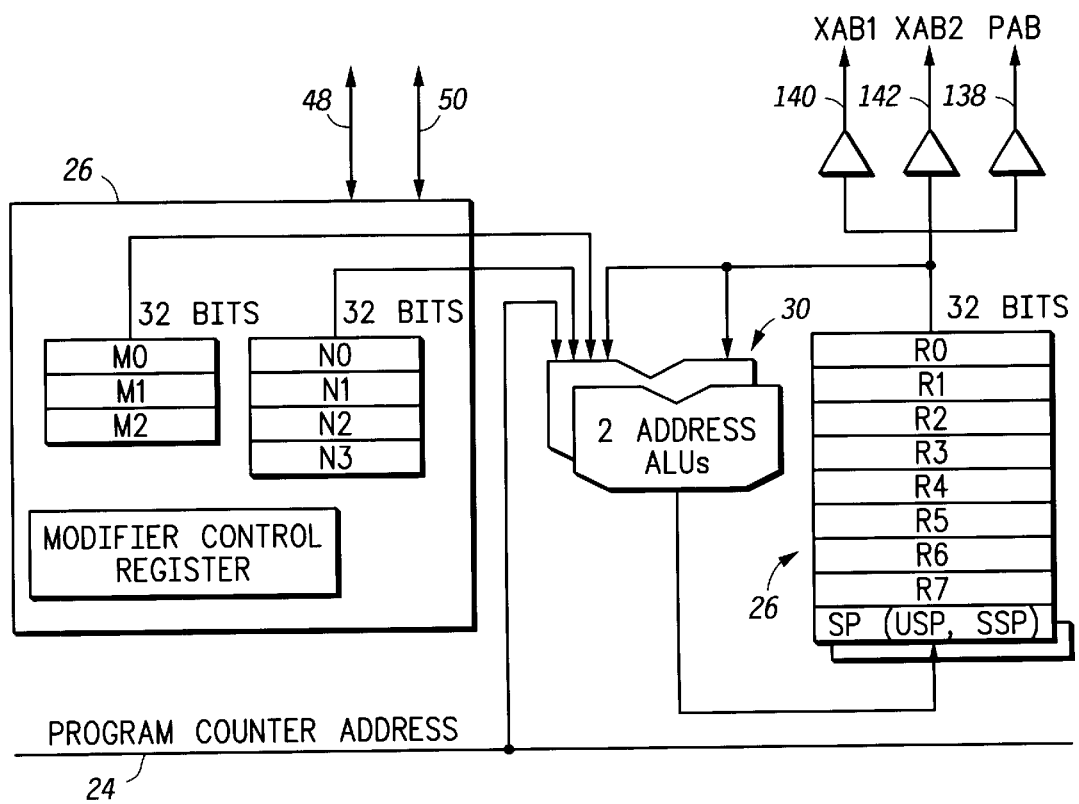
FIG. 8 is a diagram that illustrates a particular embodiment of the address generation unit within the core of the system of FIG. 1.

Referring to FIG. 8, a particular embodiment of the address generation unit (AGU) is illustrated. The AGU includes registers M0–M2, N0–N3, R0–R7, SP from address register file 26, and the modified control register (MCTL). The AGU also includes address arithmetic logic units 30. The AGU is coupled to the first and second address buses 140, 142 and to the program address bus 138 via registers 26. As illustrated in FIG. 8, the ALUs 30 receive data from the various registers, perform selected arithmetic operations on the input data, and provide an arithmetic result to selected output registers. For example, an address stored in register R0 may be output over bus 140. Thereafter, the register R0 may be added to an offset from a selected register N0 and the resulting addition output stored in register R0.

Figure 9:
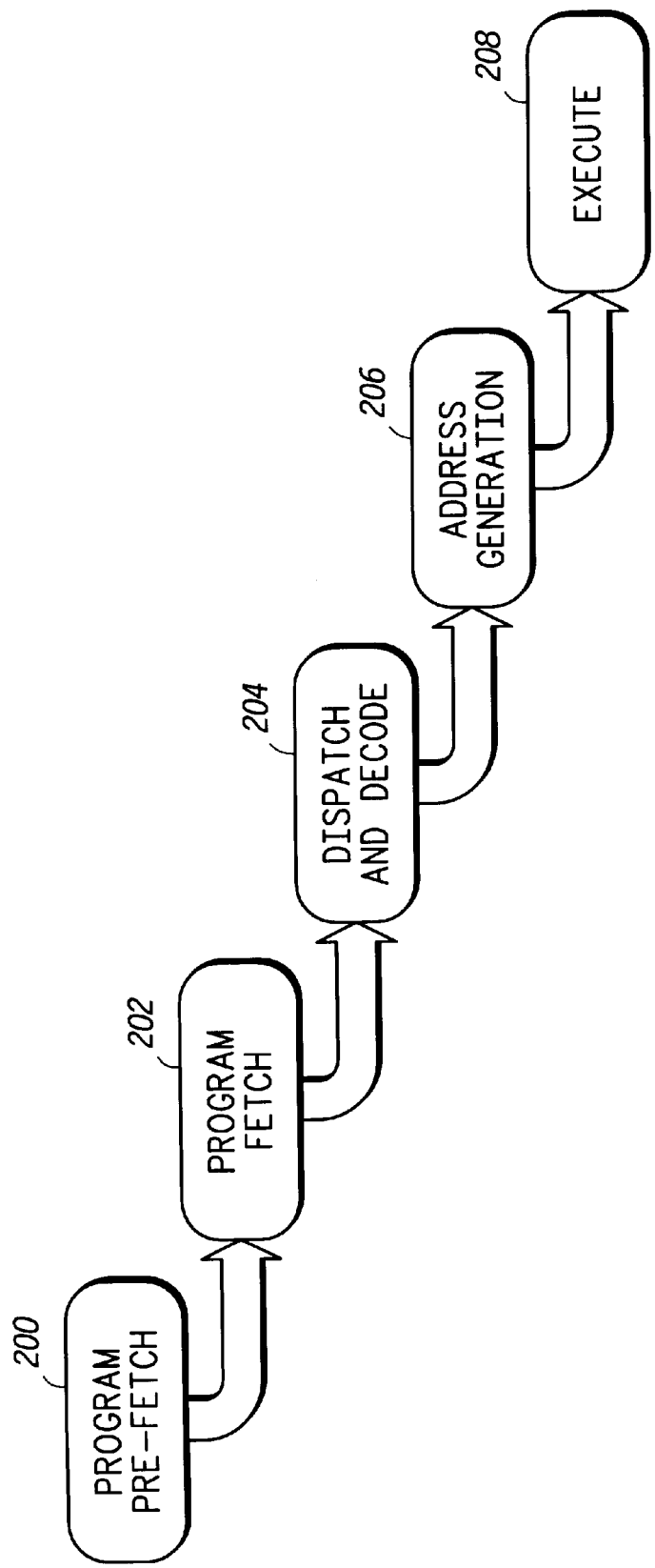
FIG. 9 is a diagram that illustrates a particular embodiment of a method of pipelining instructions to be executed by the system of FIG. 1.

FIG. 9 illustrates a pipeline execution method that is used with the system 10 of FIG. 1. The pipeline method includes the execution steps of program pre-fetch 200, program fetch 202, dispatch and decode 204, address generation 206, and execute 208.

Figure 10:
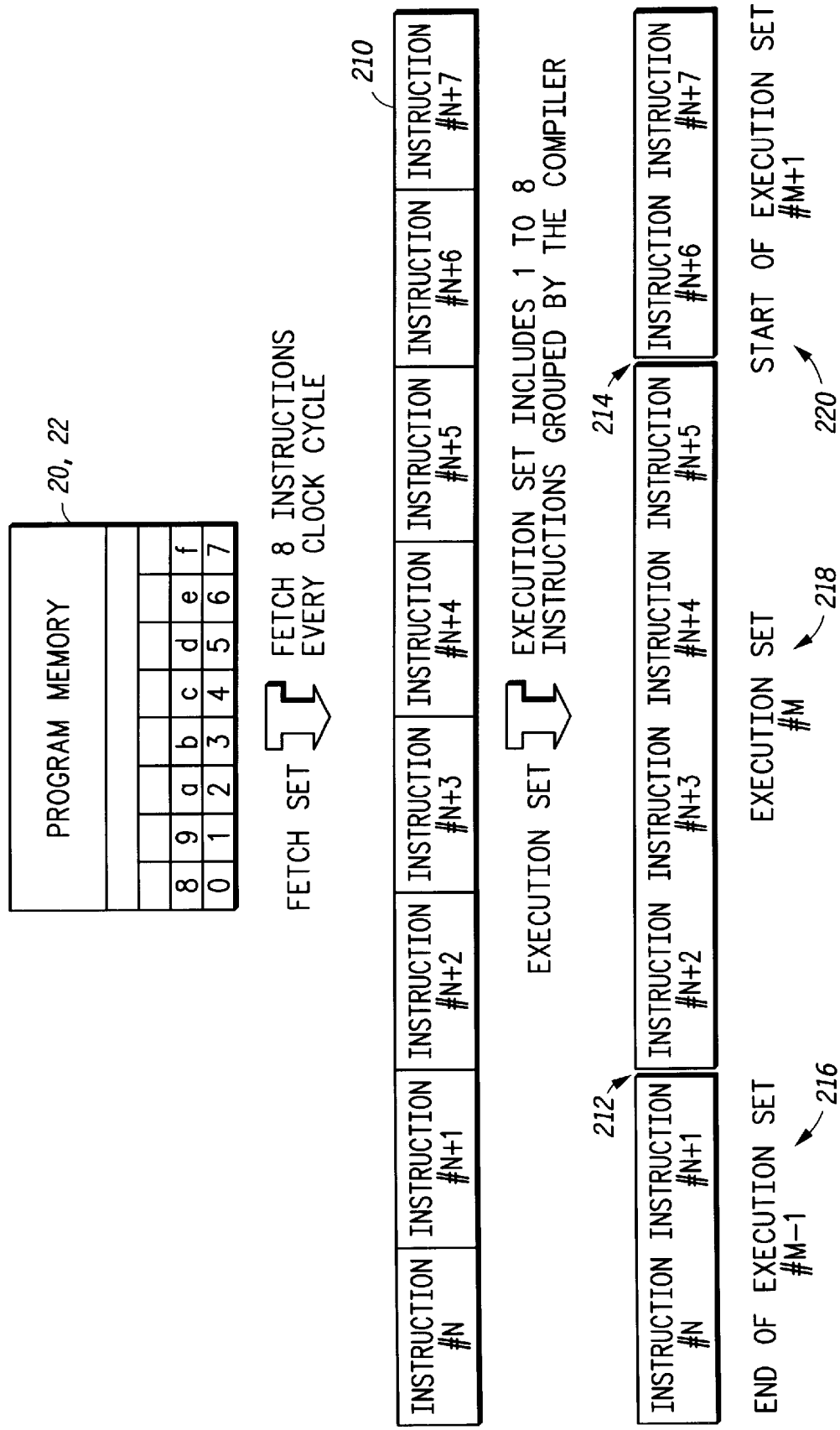
FIG. 10 is a diagram that illustrates a set of fetched computing instructions and an execution set of grouped computing instructions to be executed by the system of FIG. 1.

FIG. 10 illustrates an instruction fetch set and grouped instruction execution sets. The instruction fetch set 210 comprises a sequence of instructions to be executed. In the illustrated embodiment, the instruction sequence includes eight instructions, numbered from N to N+7. In a hardware implementation, this instruction sequence may be implemented as one or more instruction buffers. The instructions comprising fetch set 210 have been statically grouped at program preparation time into, for example, execution sets 216, 218, and 220. In the illustrated example, a first boundary 212 separates the last two instructions #N and #N+1 of first execution set 216 from the four instructions #N+2–#N+5 comprising second execution set 218, and a second boundary 214 separates the second execution set 218 from the first two instructions #N+6 and #N+7 of third execution set 220. Each of the instructions in the same execution set are dispatched by the system concurrently. All of the instructions in a particular execution set may be dispatched or issued at substantially the same time, and in certain cases where each of the instructions in an execution set have the same cycle count, each of the instructions may be retired at the end of the last execution cycle.

Figure 11:
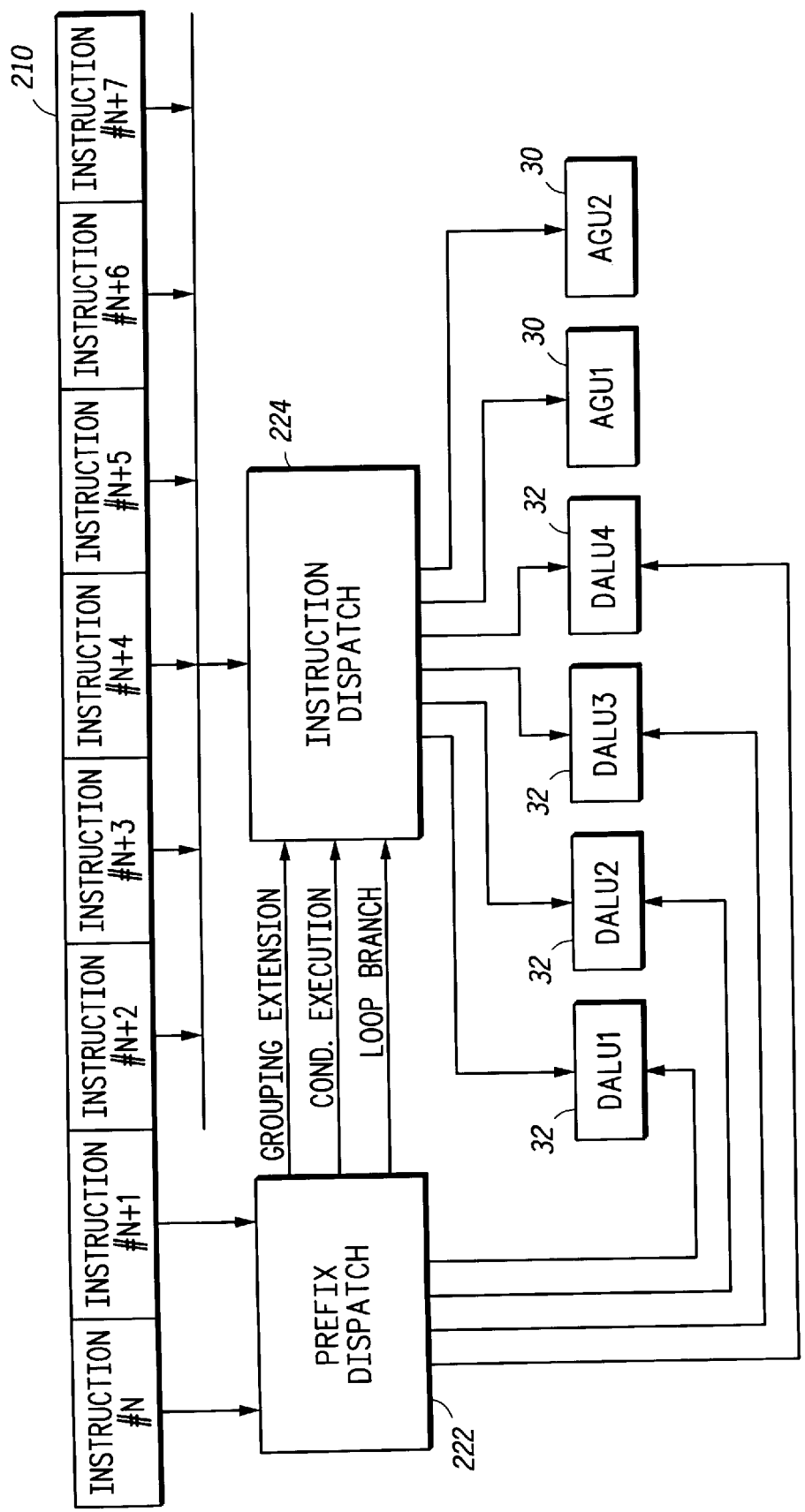
FIG. 11 is a diagram that illustrates a prefix dispatch and instruction dispatch operation for the core of the system of FIG. 1.

Referring to FIG. 11, a particular embodiment of a portion of the system 10 is illustrated. The embodiment illustrates a prefix dispatch unit 222, the instructions 210, an instruction dispatch module 224, various data arithmetic logic units (DALUs) 32, and address generation units (AGUs) 30. The prefix dispatch unit 222, instructions 210 and instruction dispatch module 224 may form the program sequencer 24. In the illustrated embodiment, since there are six execution units, the maximum number of instructions that may be grouped in an execution set would be six. In the illustrated example, the first two instructions N, N+1 are prefix instructions. The prefix instruction is passed to the prefix dispatch unit 222. The prefix instruction may include one or as illustrated more than one prefix word. The prefix dispatch unit 222 converts the prefix instructions to control signals, such as the grouping extension, conditional execution, and loop branch control signals, that are fed to the instruction dispatch unit 224. The instruction dispatch unit 224 then groups the instructions into execution sets and performs certain operations as directed by the control signals from the prefix dispatch unit 222. The grouped instructions are then simultaneously dispatched via a routing mechanism to the appropriate execution units 30, 32, 34 for parallel decoding and execution. Simultaneous dispatch means that execution of each of the grouped instructions is initiated during a common clock cycle. In the illustrated embodiment of the system 10, execution of each of the grouped instructions is initiated during a common clock cycle, but one or more of the grouped instructions may complete execution during a different clock cycle.

Figure 12:
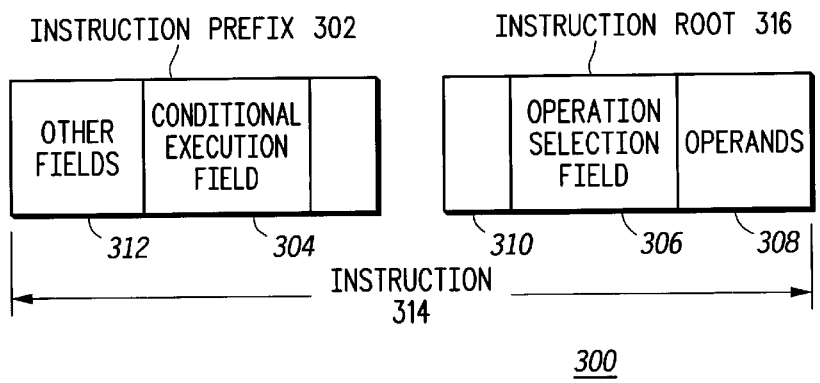
FIGS. 12–17 illustrate various embodiments of an instruction system that may be used with the system of FIG. 1.

Referring to FIG. 12, a particular embodiment of an instruction system 300 that may be used with the system 10 is illustrated. The instruction system 300 includes an instruction prefix word 302 and an instruction root word 316. The instruction prefix 302 includes a conditional execution field 304 and other fields 312. The instruction root 316 includes an operation selection field 306, an optional operand field 308, and an optional field 310 for other operations, such as grouping multiple instructions without a prefix. The conditional execution field 304 contains information on whether the instruction root 316 is to be conditionally executed. For example, if the conditional execution field is a first value, then the instruction root will be unconditionally executed; if a second value, then the instruction root will be conditionally executed, depending upon the value of a predetermined bit within a status or data register. Where there is more than one instruction root that is grouped in an execution set, the conditional execution field 304 is used to determine whether or not the entire group of instruction roots 316 are executed. However, in an alternative embodiment, not shown, the conditional execution field 304 can control selective execution or non-execution of one or more instruction roots or subsets thereof that follow the prefix. In another embodiment, each of a plurality of conditional execution fields corresponds to each of a plurality of instruction roots to individually control execution of each instruction root in an instruction group. In a preferred embodiment, the prefix 302 and instruction root(s) 316 form a single, integral instruction 314. In such a system, if the instruction 314 is to be unconditionally executed and the prefix 302 is not needed for any of its other uses, to be described hereinafter, it may be deleted from instruction 314.

Figure 13:
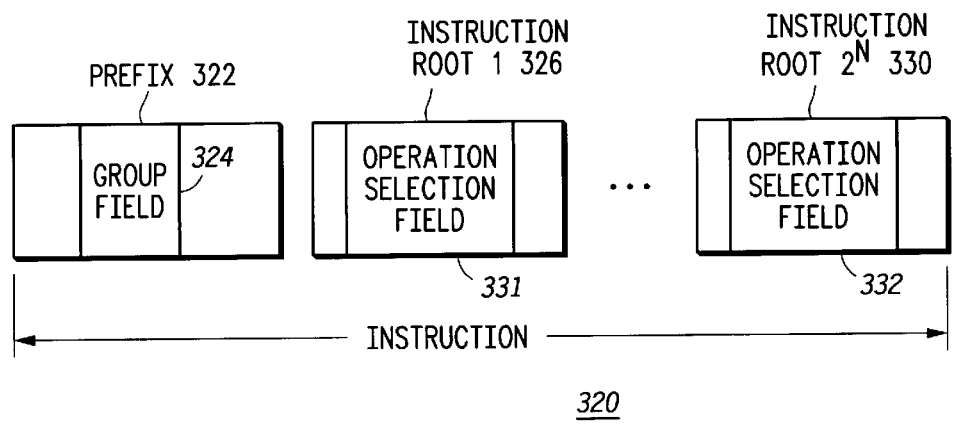
Figure 14:
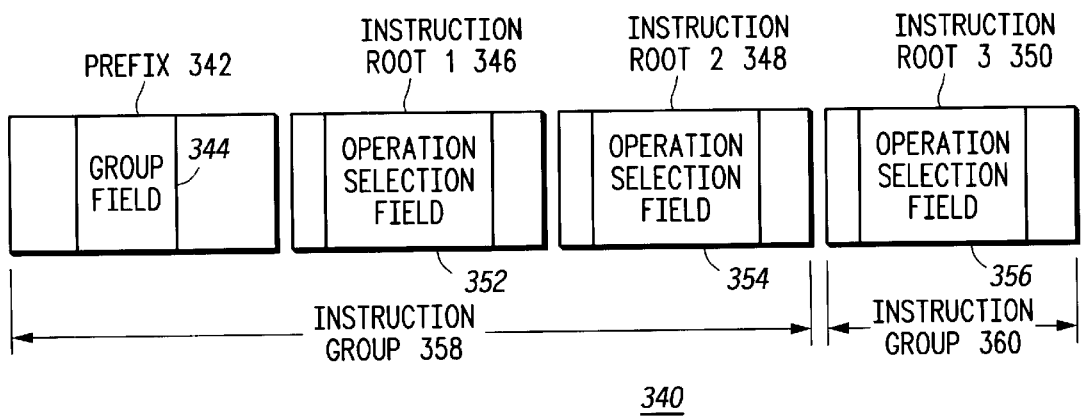

Referring to FIG. 13, an embodiment of an instruction system 320 is disclosed. The instruction system 320 includes a prefix 322, a first instruction root 326, and up to $2^N$ instruction roots 330. The prefix 322 includes a group field 324 that is N bits wide. Each of the instruction roots 326–330 include an operation selection field 331, 332 and other optional fields. The group field 324 indicates how many instruction roots 326–330 immediately following the prefix 322 are to be executed in parallel. Thus, the group field 324 in prefix 322 explicitly groups the instruction roots into execution sets. In the preferred embodiment, instruction roots having a variety of operation selection field values can be grouped with other instruction roots, while others values may not be grouped due to hardware or timing constraints. As illustrated in FIG. 14, the instruction words 346, 348 are combined with the prefix 342 to form an instruction group 358, whereas the instruction root 350 is not grouped and forms a single word instruction group 360.

Figure 15:
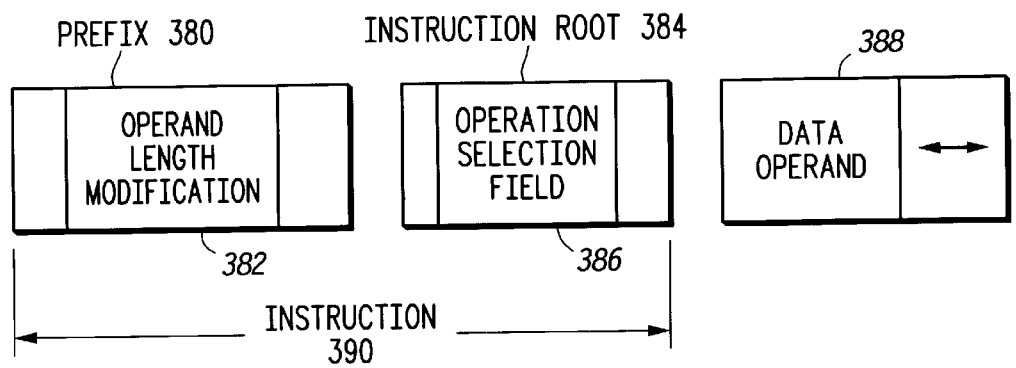

Referring to FIG. 15, another embodiment of an instruction system is illustrated. The instruction system includes a prefix 380, and an instruction root 384. The instruction system operates on a variable width data operand 388, such as a 32 bit or 64 bit data item transferred to or from memory. The prefix 380 includes an operand length modification field 382, and the instruction root 384 includes an operation selection field 386. The prefix 380, instruction root 384 and operand 388 together form an instruction 390. The operand length modification field 382 indicates whether the operand 388 has a first predetermined length, or a modified second length. For example, where the operation selection field 386 indicates that the instruction root 384 is a move operation for a 16-bit word, and where the operand length modification field 382 is clear, the operand has a length of 16-bits. However, if the operand length modification field 382 is set, then the operation becomes a move operation for a 32-bit word and the operand has a length of 32-bits. By encoding the length modification field into the prefix word 380, the number of operations that may be selected for execution is increased but without having to add any extra length to the operation select field 386 within the instruction root 384, thereby reducing code size in certain circumstances.

Figure 16:
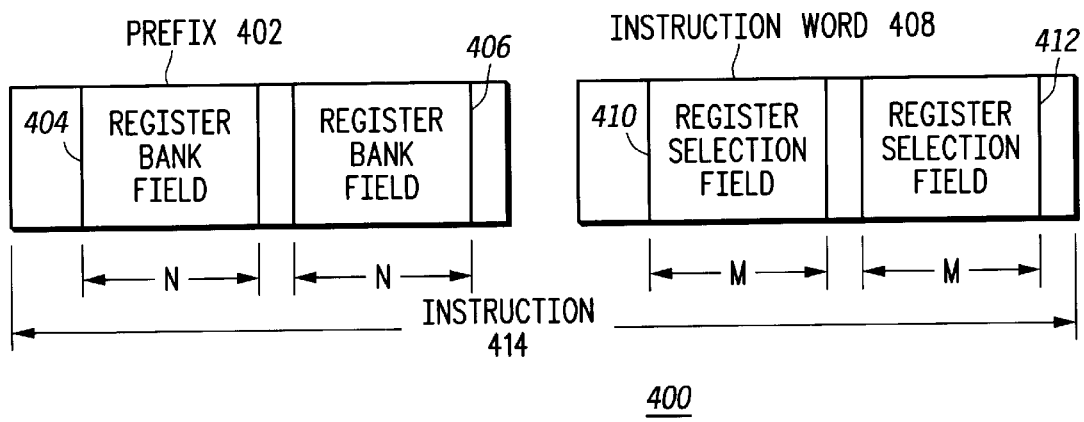

Referring to FIG. 16, an embodiment of an instruction system 400 is disclosed. The instruction system 400 includes a prefix 402 and an instruction root 408. The prefix 402 includes one or more register bank selection fields, such as a first register bank selection field 404 and a second register bank selection field 406. The first and second register bank selection fields 404, 406 are N-bits in length. The instruction word 408 includes M-bit register selection fields 410, 412. The first register bank selection field 404 may be used to indicate a particular bank of registers that are to be used for a first execution unit, such as a first DALU unit 32. The second register bank selection field 406 may be used to indicate a particular bank of registers that are to be used for a second execution unit, such as a second DALU unit 32. In a particular embodiment, N is 1 and M is 3. In this embodiment, there are two different register banks, such as the register files 28 and 29 of the system 10, and each of the register banks has eight registers. In this manner, the upper bank registers, such as registers R8–R15 of register file 29 may be selectively accessed using the register bank selection fields 404–406 of prefix word 402 instead of using extra space within the instruction word 408, thereby saving instruction word memory space in certain circumstances.

Figure 17:
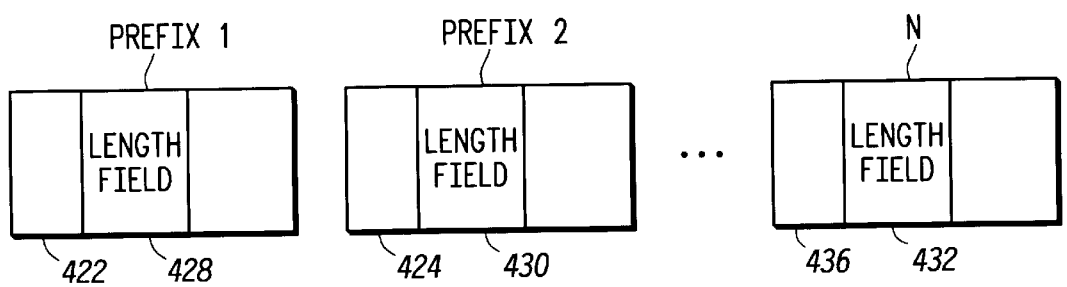

Referring to FIG. 17, an embodiment of an instruction system 420 with variable length prefix words is shown. The instruction system 420 includes a first prefix word 422, a second prefix word 424, and an Nth prefix word 436. Each prefix word 422, 424, 426 includes a respective prefix length field 428, 430, 432. The prefix length fields 428, 430, 432 form a chain, each indicating whether the prefix word chain is completed or whether there is an additional prefix word. In this manner, many prefix words may be linked together in a variable length chain. However, in the preferred embodiment the first prefix word 422 does not include the length field since the first and second prefix words have other fields that indirectly indicate whether the prefix is one or two words in length.

A particular embodiment of an instruction system using an encoded prefix instruction that combines many of the previously illustrated prefix fields is disclosed below. In this embodiment, there is a one word prefix encoding format and a two-word prefix encoding format.

In the one word prefix encoding format, the one word prefix has the following binary layout:
1001 aaaa 1110- pjcc
where:
    aaaa: number of instruction words to be grouped including the prefix word, minus 1
        if aaaa==0: this is a NOP instruction, which is not dispatched for 4 DALU flavor, valid values for aaaa are 0 to 6 for 4 DALU system
    cc: conditional execution of the entire execution set
        00 unconditionally executed
        01 reserved
        10 conditionally executed, if status register T is set
        11 conditionally executed, if status register T is clear
    pj: two bits used in a looping mechanism
    "-": reserved for future use such as additional looping information.
In the two-word form, the prefix has the following format:
    src0 src1 dest
encoding: 0011 aaaa TTHH pjcc 101M bBeE bBeE bBeE
where:
    aaaa, cc, pj: same as for one word prefix
    For example:
        aaaa ==3 ->two word prefix +2 grouped instruction words
    M: reserved for future expansion for longer prefix words.
        0: the prefix is two-words
        1: the prefix is at least 3 words long (at least one additional word)
    EEE: Data register expansion for DALU UNIT 0; each of the E bits serves as a fourth register field encoding bit, effectively turning FFF ->FFFF, etc.

Figure 18:
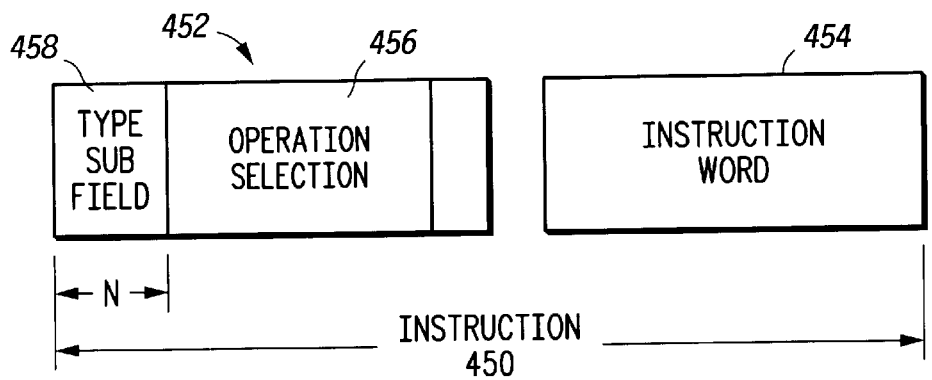
FIG. 18 is a diagram that illustrates an instruction system that uses static grouping.

--1: high data reg used for the FFF field
-1-: high data reg used for the J2 field
1--: high data reg used for the J1 field
   Note: FFF,J2,J1 are operand fields.
   For example:
      DALU DJ1,DJ2,DF
In case of two operand DALU unit instructions, only -EE is used.
In case of one operand DALU unit instructions, only --E is used.
   eee: the same as EEE, for DALU UNIT 1
   BBB: the same as EEE, for DALU UNIT 2
   bbb: the same as EEE, for DALU UNIT 3
   HH: Data register expansion for AGU instructions.
      -1 high data reg used for MOVE operation in AGU 0
      1- high data reg used for MOVE operation in AGU 1
      For example, in the system 10, the registers in register file 29 are used instead of register file 28 when the H bit is set to 1.
   TT: Scaling up MOVE instructions for wider transfers; each bit activates one AGU unit. For each unit, the bit applies if the unit also decodes one of the instructions: MOVE.2W, MOVE.2F, MOVE.L
      If the T bit is 0: leave these instructions as originally defined if the T bit is 1:
      MOVE.2W ->MOVE.4W
      MOVE.2F ->MOVE.4F
      MOVES.2F ->MOVES.4F
      MOVE.L ->MOVE.2L
      -1 make instruction in AGU0 be interpreted as a wider move 1- make instruction in AGU 1 be interpreted as a wider move In principle these combinations are reserved for the following, if defined: MOVE.2L MOVE.4W MOVE.4F In accordance with another embodiment, a method of grouping instructions without using a prefix instruction is now disclosed. Referring to FIG. 18, an instruction without a prefix word that may be used to perform static grouping is illustrated. The instruction 450 includes one or more instruction words, such as a first instruction word 452 and a second instruction word 454. The first instruction word 452 contains an operation selection field 456, also referred to as an opcode, that may be used to select a plurality of different operations that may be performed on a system such as system 10. The operation selection field 456 includes a type subfield 458 that has a width of n bits. In a particular embodiment, n is equal to two. While a two instruction word instruction has been illustrated as an example, the type subfield within the operation selection field and the use of the type subfield as described herein is applicable to single word and to multiword instructions of many types.

Figure 19:
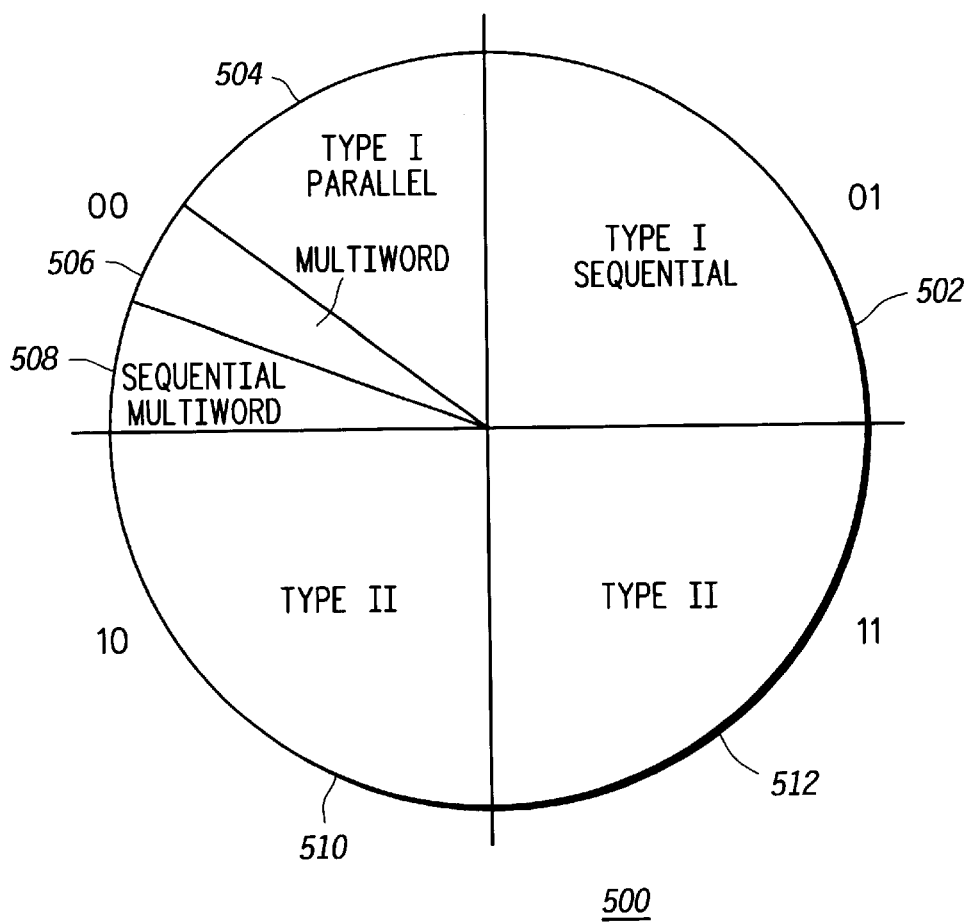
FIG. 19 is a diagram that illustrates different values for a type subfield within the instruction system of FIG. 18.

Referring to FIG. 19, a diagram is presented that illustrates how different types of instructions that are encoded by the operation selection field within an instruction may be mapped to the value within the type subfield. The type subfield is generally used to provide grouping and multi-word instruction information for an execution set with multiple instructions and/or multiple instruction words. The instructions that may be executed are divided at a high level into type I instructions and type II instructions. Type I instructions may be executed in either a sequential or a parallel manner, i.e. the Type I instructions may be grouped with other instructions for execution in an execution set. Type II instructions may be executed sequentially, but have limited ability to be executed in parallel or may not be groupable at all. Some type II instructions 510 can not be grouped with any other instruction. An example of such an ungroupable instruction is the doze instruction that places the data processor 10 in a low power standby mode.

As shown in FIG. 19, for type I instructions that are to be executed sequentially, the type subfield is set to a first value, such as 01 for segment 502 in the illustrated embodiment. For type I instructions that are to be executed in parallel with other one word instructions, the type subfield is set to a second value, such as 00, segment 504 in diagram. At least one type II instruction is assigned a third value, such as either 10, segment 510, or optionally a fourth value, such as 11, segment 512. Using the type subfield with two bits as shown for instruction grouping leads to a reduction in the usable opcode space for the selection of instructions. For example, in a prior system, if a single bit was dedicated for grouping information, the opcode space would disadvantageously be reduced by fifty percent (%50). With a system of two bits, the opcode space would be reduced twenty five percent (25%).

However, in the illustrated embodiment, to conserve useful opcode space, certain multiword instructions re-use a portion of the opcode space for the second value, i.e. 00, of the type subfield. Segment 506 for multiword instructions that are to be executed in parallel with at least one other instruction and segment 508 for multiword instructions that are to be executed sequentially use a portion of the opcode quadrant that shares the type I parallel one word instructions. One method of implementation this re-use technique is to use combinations of instructions that would not otherwise be allowed, such as combining a type I groupable instruction with a type II non-groupable instruction. By using otherwise contradictory instruction combinations, multiword sequences may be encoded. In this manner, valuable opcode space is conserved leading to an improved instruction system.

An example of the different types of instructions described generally above is presented below. The actual assembly instructions are in parentheses.

Type I sequential 502: increment register D0 (inc d0)
   Type I parallel 504: increment register d0 and move word at address of register r0 to register d1 (inc d0, move.w (r0), d1) (two single word paired instructions)
   Multiword 506: move address in register after adding offset to register d3 (inc d0, move.b (R3+1000), d3) (one single word and one multiword instruction)
   Multiword Sequential 508: add 1000 to d0 and store in d1 (add #1000, d0, d1)
   Type II 510 or 512: take a break in execution (doze)

While the Type II instructions in segments 510, 512 may be the same type, in a particular embodiment, the instructions could be divided such that the instructions with no grouping permitted are placed in segment 510 and the instructions with limited grouping permitted are placed in segment 512.

With instructions having the type subfield as described above, general rules for grouping instructions may be used. An example of such rules are:
1. Instruction words having a type subfield of 00 is followed by additional instruction words to be grouped.
2. Instruction words having a type subfield other than 00 are the last word in the instruction.
3. A 10 in the last instruction word where there is at least two instruction words in the execution set indicates there is at least one multiword instruction to be executed.
4. A bit after the type subfield in the second word in an instruction group can be used to distinguish two word instructions with pairing versus three word instructions. In one embodiment, the distinguishing bit is the bit immediately following the type subfield in the second instruction word of a group of instruction words. Using additional bits in the same or other instruction words may distinguish other instructions such as four word instructions versus three word instructions, and paired one or two word instructions.

In a particular illustrative embodiment, there are 3 ways to convey grouping information for grouping instructions into execution sets:

using the 2–3 most significant bits in the instruction -- no prefix is used
using a 1-word prefix for an execution set
using a 2-word prefix for an execution set The following grouping algorithm chooses what option to use (when the instructions to be grouped are given) to reduce the instruction code size.

The algorithm is:
are registers d8–d15 used in the execution set?
  *yes ->use 2-word prefix
  *no ->continue
is the set conditionally executed (Ifc), or should it convey looping information?
  *yes ->use 1-word prefix
  *no ->continue
does the execution set have just one instruction?
  *yes ->no prefix needed
  *no ->continue
are the instructions in the set groupable according to their type?
  *yes ->no prefix needed—encode grouping using the 2 most significant bits only
  *no ->use 1-w prefix A further description in tabular form of a static grouping embodiment is disclosed below.

One-word instruction type encoding:
2 most significant bits of the

| type subfield 458: | type | grouping permitted |
|---|---|---|
| 00 | 1 | grouped with the next instruction |
| 01 | 1 | end of exec set -- may be grouped with previous type 1 instructions (00) |
| 11 | 2 | end of exec set -- may be grouped with previous type 1 instructions (00) (no fully groupable version) |
| 10 | 4 | only instruction in the set, cannot be grouped |

Two and three word identification:
(L—last instruction in the execution set)

| word L-1 | word L | |
|---|---|---|
| 00 | 10 | This is an illegal situation for two one word instructions since 10 cannot be grouped with 00. Therefore this situation is kept for 2 & 3 word instructions |

| word L-2 | word L-1 | word L | |
|---|---|---|---|
| don't care | 000 | 10 | (L-1,L) is a two word instr. (type 3) -- may be grouped with the previous instruction |
| not 00 | 001 | 10 | two words, ungroupable (type 4). (word L-2 belongs to the previous exec set) |
| 00 | 001 | 10 | (L-2, L-1, L) is a three word group instr. (type 3) -- may be grouped with the previous instruction |

Certain additional aspects of the present disclosure are summarized below.

In a data processor adapted to perform selected operations, an instruction system includes a prefix word having a conditional execution field for selecting a condition under which the data processor will perform an operation to be selected and an instruction word having an operation selection field for selecting the operation to be performed by the data processor. The conditional execution field may select a condition under which the data processor will not perform the selected operation. In one embodiment, the prefix word and the instruction word comprise an instruction or an execution step, the performance of which by the data processor is conditioned upon the conditional execution field of said prefix word. The instruction may include more than one instruction word. In another embodiment, the prefix is optional in the instruction.

A system for instructing a data processor adapted to perform selected operations, where the system includes a prefix word having a conditional execution field for selecting a condition under which the data processor will perform an operation to be selected; and an instruction word having an operation selection field for selecting the operation to be performed by the data processor. The conditional execution field may select a condition under which said data processor will not perform the selected operation. In one embodiment, the prefix word and the instruction word comprise an instruction, the performance of which by the data processor is conditioned upon the conditional execution field of the prefix word. The instruction may include more than one instruction word. Also, the prefix may be optional in the instruction.

In another embodiment, the present disclosure relates to a system for instructing a data processor adapted to perform selected operations, where the system includes a prefix word having a conditional execution field for selecting a condition under which the data processor will perform an operation to be selected, and an instruction word having an operation selection field for selecting said operation to be performed by the data processor. The conditional execution field may select a condition under which the data processor will not perform said selected operation.

The prefix word and the instruction word may comprise an instruction, the performance of which by the data processor is conditioned upon the conditional execution field of the prefix word. The instruction may include more than one instruction word.

Another embodiment relates to an instruction system in a data processor adapted to perform operations on operands having first and second lengths. The instruction system includes a prefix word having an operand length modification field for modifying an operation to be selected so as to be performed on an operand having said second length, and an instruction word having an operation selection field for selecting the operation to be performed on an operand having said first length. In one embodiment, the operands have a plurality of lengths, the operation selection field selects an operation to be performed on an operand having a predetermined one of said plurality of lengths, and the operand length modification field modifies the operation so as to be performed on an operand having a different one of said plurality of lengths.

In a data processor, an instruction system includes a prefix word having an instruction group field for selecting a length of an instruction group, and a plurality of instruction words, each instruction word having an operation selection field for selecting an operation to be performed by said data processor. The data processor simultaneously initiates the performance of all operations selected by the instruction words comprising said group. The prefix word and the instruction word may form an instruction. In one embodiment, the prefix word precedes each instruction word in said instruction. In another embodiment, the instruction group field is of length n and may group 2n of said plurality of instruction words. There are also certain instruction words that cannot be grouped with any of the plurality of instruction words.

A system for instructing a data processor is provided. The system includes an instruction root and an instruction prefix. The instruction root has an operation selection field for selecting an operation to be performed by said data processor. The instruction prefix has a field selected from at least one of the following: a conditional execution field for selecting a condition under which the data processor will perform said selected operation, an operand length modification field for modifying the selected operation so as to be performed on an operand having a different length, an instruction group field for selecting a word length of an instruction group that includes the instruction root, and a prefix length selection field for selecting a word length of said instruction prefix. The instruction may include more than one instruction root. The prefix typically precedes at least one of the instruction roots.

A system for instructing a data processor having a plurality of registers. The system includes an instruction root having a register selection field of width m, for selecting one of $2^m$ registers in said data processor; and an instruction prefix having a register selection extension field of width n, for extending the width of said register selection field to select one of $2^{m+n}$ registers in said data processor.

Thus, there has been described herein an embodiment including at least one preferred embodiment of an improved method and apparatus for grouping data processor instructions and embodiments of instruction systems. It will be apparent to those skilled in the art that the disclosed subject matter may be modified in numerous ways and may assume many embodiments other than the preferred form specifically set out and described above. For example, the specific elements and configuration of the data processor 10 is described by way of example only. Many other alternative systems may be used. For example, the DMA 16, memory 20, 22, and certain execution units in the core 12 are optional. Accordingly, the above disclosed subject matter is to be considered illustrative and not restrictive, and to the maximum extent allowed by law, it is intended by the appended claims to cover all such modifications and other embodiments which fall within the true spirit and scope of the present invention. The scope of the invention is to be determined by the broadest permissible interpretation of the following claims and their equivalents rather than the foregoing detailed description.

What is claimed is:

1. An instruction system comprising:
   a plurality of $2^N$ instruction roots, where N is an integer, each instruction root having an operation selection field for selecting an operation to be performed by a data processor; and
   an instruction prefix preceding one or more of the plurality of $2^N$ instruction roots, wherein the improvement comprises:
   an instruction comprising an instruction prefix having a field that is N bits wide and that explicitly groups predetermined ones of the plurality of $2^N$ instruction roots into execution sets to be executed in parallel without requiring group identifier information to be included in each of the $2^N$ instruction roots.

2. The instruction system of claim 1 wherein the conditional execution field may select a condition under which said data processor will not perform said selected operation.

3. In a data processor, an instruction system comprising:
   a plurality of instruction roots, each instruction root having an operation selection field for selecting an operation to be performed by said data processor; and
   an instruction prefix having a single, contiguous instruction group field for selecting a predetermined plurality of said plurality of instruction roots to comprise a group of instruction roots forming a single instruction, the instruction group field containing a value for indicating how many instruction roots follow the instruction prefix and explicitly grouping the instruction roots, the data processor substantially simultaneously initiating the performance of all operations selected by said group, wherein the plurality of instruction roots do not use available bits to contain grouping information.

4. The instruction system of claim 3 wherein the instruction group field is of length n and may group $2^n$ of said plurality of instruction roots.

5. The instruction system of claim 3 wherein the single instruction further comprises an instruction root which cannot be grouped with any of said plurality of instruction roots.

6. In a data processor adapted to execute first and second types of operations sequentially and a plurality of said first types of operations in parallel, an instruction system comprising:
   an instruction having an operation selection field for selecting one of said first and second types of operation to be executed by said data processor, the operation selection field having a type subfield of width n, the values of which are assigned as follows:
   a first value if said first type of operation is to be executed sequentially;
   a second value if said first type of operation is to be executed in parallel; and
   a third value selected from the remaining ($2^n-2$) values if said second type of operation is to be executed.

7. The instruction system of claim 6 wherein said type subfield is assigned the second value if a selected one of said second type of operation is to be executed sequentially.

8. A system for instructing a data processor adapted to execute first and second types of operations sequentially and a plurality of said first type of operations in parallel, the system comprising:
   an instruction having an operation selection field for selecting one of said first and second types of operations to be executed by said data processor, the operation selection field having a type subfield, the type subfield having:
   a first value for operations of said first type to be executed sequentially;
   a second value for operations of said first type to be executed in parallel and for at least one selected operation of said second type to be executed sequentially.

9. The system of claim 8, wherein the type subfield has a third value.

10. A data processing system adapted for executing grouped instructions comprising:
- a processor for receiving and executing grouped data processing instructions that have been grouped by at least two different methods to group instructions, each instruction grouping method using a different instruction format to define instruction grouping.

11. The data processing system of claim 10 wherein a first of the at least two different methods to group instructions comprises using an instruction prefix and one or more instruction portions, the instruction prefix having an instruction group field containing a value for indicating how many instruction portions follow the instruction prefix for parallel execution.

12. The data processing system of claim 11 wherein a second of the two different methods to group instructions comprises grouping by using a bit encoding having values that define an instruction as either: (1) a first type that may either be grouped with other instructions for parallel execution or not grouped and executed sequentially, or (2) a second type that may not be executed in parallel.

* * * * *

UNITED STATES PATENT AND TRADEMARK OFFICE
CERTIFICATE OF CORRECTION

PATENT NO. : 6,418,527 B1
DATED : February 6, 2003
INVENTOR(S) : Zvika Rozenshein et al.

It is certified that error appears in the above-identified patent and that said Letters Patent is hereby corrected as shown below:

<u>Column 14,</u>
Lines 12-14, change claim 2 by canceling all of claim 2 and inserting the following claim:
2. The instruction system of claim 1 wherein the instruction prefix further identifies at least one additional instruction group having a single instruction root to form a single word instruction group that cannot be grouped for parallel execution with the explicitly grouped predetermined ones of the plurality of 2N instruction roots to be executed in parallel.

Signed and Sealed this

Twenty-second Day of July, 2003

JAMES E. ROGAN
*Director of the United States Patent and Trademark Office*